US008465572B1

(12) United States Patent
Ball, IV et al.

(10) Patent No.: US 8,465,572 B1
(45) Date of Patent: Jun. 18, 2013

(54) HORIZONTAL HEATER TREATER

(75) Inventors: Will D. Ball, IV, Bixby, OK (US);
Lester J. Broussard, Tulsa, OK (US);
Lucas C. Broussard, Broken Arrow, OK (US)

(73) Assignees: Shale Oil and Gas Technologies, Ltd, Tulsa, OK (US); Midstream Equipment Fabrication LLC, Skiatook, OK (US)

(*) Notice: Subject to any disclaimer, the term of this patent is extended or adjusted under 35 U.S.C. 154(b) by 0 days.

(21) Appl. No.: 13/306,003

(22) Filed: Nov. 29, 2011

(51) Int. Cl.
*B01D 19/00* (2006.01)

(52) U.S. Cl.
USPC ............................................. 95/253; 96/184

(58) Field of Classification Search
USPC ................. 95/253; 96/184, 185, 186; 210/537
See application file for complete search history.

(56) References Cited

U.S. PATENT DOCUMENTS

| | | | |
|---|---|---|---|
| 2,685,938 A * | 8/1954 | Walker et al. | 96/165 |
| 2,713,919 A * | 7/1955 | Walker et al. | 95/252 |
| 2,751,998 A * | 6/1956 | Glasgow | 95/24 |
| 3,347,773 A * | 10/1967 | Turner | 204/662 |
| 3,389,536 A | 6/1968 | Bull | |
| 3,708,960 A | 1/1973 | Christopher, Jr. et al. | |
| 3,727,382 A * | 4/1973 | Jackson | 96/174 |
| 4,012,207 A | 3/1977 | Jones | |
| 4,329,159 A | 5/1982 | Bull | |
| 4,396,404 A | 8/1983 | Engelman et al. | |
| 4,995,495 A * | 2/1991 | Krynski | 196/46 |
| 6,872,239 B2 * | 3/2005 | Nilsen et al. | 95/30 |
| 7,531,099 B1 * | 5/2009 | Rhodes | 210/800 |
| 8,337,603 B2 * | 12/2012 | Akhras et al. | 96/184 |

* cited by examiner

*Primary Examiner* — Duane Smith
*Assistant Examiner* — Douglas Theisen
(74) *Attorney, Agent, or Firm* — Molly D. McKay

(57) ABSTRACT

A horizontal heater treater tank for separating petroleum mixtures. An inlet on one end of the tank and gas, water, and oil outlets provided on an opposite end, with each outlet having a vortex breaker. The inlet communicating with a c-shaped inlet diverter where gas separates into the top of a heating section and the fluids flow to the bottom of the heating section. Sediment collects in the bottom of the heating section and is removed via a sand trap. Water remains at the bottom of the tank, and oil completely surrounds a horizontally oriented u-shaped firetube which heats the oil. The fluids flow through a perforated baffle then a bent lamella separator before entering a settling portion of the tank where gas and water exit via the gas and water outlets and oil flows over an oil weir and exits via the oil outlet downstream of the weir.

19 Claims, 5 Drawing Sheets

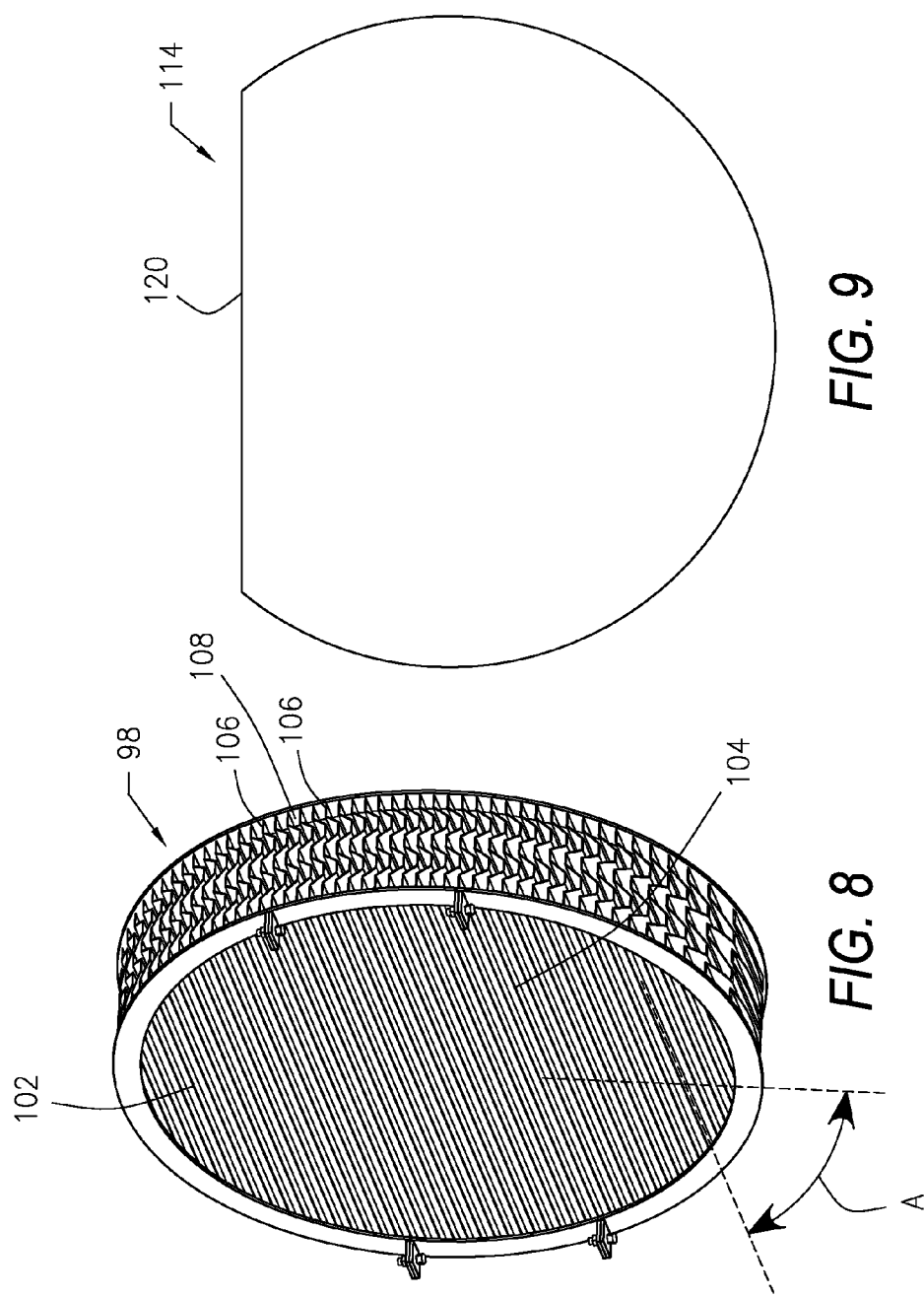

HORIZONTAL HEATER TREATER

BACKGROUND OF THE INVENTION

1. Field of the Invention

The present invention relates to an improved horizontal heater treater for the treatment of crude oil to remove gas, water and basic sediment and water (BS&W) from the oil.

2. Description of the Related Art

Heater treaters for the treatment of oil are well known in the petroleum industry. Crude oil pumped from an oil well will contain gas, water and sediment. Before the crude can be refined, the water and sediment must be removed. Also, the gas must be separated from the liquid oil so that each may be further refined and treated.

Heater treaters, as their name implies, employ heat to lower the viscosity of the crude oil so the gas, water, sediment and oil emulsions—can be separated from each other. The heater treater functions to remove the basic sediment and water, commonly referred to as the BS&W, from the other two components and to separate the oil from the gas.

However, several problems exist within the technology employed in current heater treaters that makes them less efficient than desired.

One problem with some heater treaters is that they are vertical instead of horizontal. By employing a horizontal vessel with an inlet on one end of the vessel and outlets on an opposite end of the vessel, this allows for longer residence time in the vessel and thus results in better separation.

Another problem with some heater treaters is that they do not provide means for initially separating water from the oil and preventing reentrainment of the water in the oil prior to heating. Because water is more heat conductive than oil and because heating the water does not result in improved separation like heating of the oil, failure to initially separate water or failure to prevent reentrainment of water in the oil prior to heating results in much higher heating costs than necessary. This makes the units less efficient and more costly to operate.

An additional problem with some heater treaters is their design is not conducive to allowing efficient removal of solids from the vessel. This can lead to silting in of the vessel to the point that the vessel must be taken out of service to remove the sediment that has accumulated in the bottom.

Still a further problem with some heater treaters is they are not designed for easy access to the interior of the units so that the units can be cleaned out or otherwise serviced.

A further problem with some heater treaters is they do not have good control of the level of the oil-water interface which can result in poor separation, particularly during slug conditions.

Another problem with some heater treaters is that they depend on gravity alone to accomplish the separation of the components following heating of the mixture to be separated.

An additional problem with some heater treaters is the heater tubes are not oriented to provide maximum contact with the surrounding oil, thereby reducing the heat transfer from the heater tubes to the oil and making the unit less efficient.

A further problem with some heater treaters is they generally do not have a means for introducing the incoming fluid into the vessel in such a way that free gas is removed from the incoming stream as it enters the vessel.

Still a further problem with some heater treaters is they introduce the water and oil mixture at the top of the heating portion of the vessel instead of at the bottom of the vessel which forces the water to migrate through the oil layer and keeping it entrained in the oil for a longer period of time.

Another problem with some heater treaters is they do not employ vortex breakers on the exits of the unit.

The present invention addresses these problems and provides a reliable, easily serviceable, and efficient unit for treating petroleum mixtures.

Further, the present invention has less corrosion, less chance of fire, and requires less fuel to operate. Also, the present invention controls nitrous oxide production. Additionally, the design has full diameter openings and all of the internal components with the exception of the oil spillover weir and inlet diverter are bolted in place so that they can be removed or replaced as needed.

SUMMARY OF THE INVENTION

The present invention is a heater treater for treatment of petroleum mixtures to separate the BS&W and gas from the oil. This heater treater employs a horizontal vessel having an inlet end provided with an inlet into which is introduced the mixture to be separated. The vessel also has an opposite outlet end provided with a gas outlet, a water outlet and an oil outlet where the separated components are removed from the vessel. Solids and sediment are removed through a dedicated solids removal section in the middle of the vessel.

The inlet enters a top portion of a c-shaped inlet diverter provided within the vessel on the inlet end of the vessel. The c-shaped inlet diverter has two exits: a bottom exit where the oil and water enter below the firetube of the heating portion of the vessel, and a top exit where the gas enters above the firetube in the top of the heating portion of the vessel. As the oil and water leave the bottom exit and enter the heating portion, any settleable particles in the oil or water will sink to the bottom, while the light components will rise to the top. The heating portion of the vessel extends through the sealed center of the c-shaped inlet diverter which is bounded on its inlet end by the full-diameter inlet flange of the vessel allowing easy ingress, and is bounded on the outlet end of the vessel by a perforated heat deflection/re-distribution baffle.

The heating portion of the vessel includes a u-shaped heating tube, or firetube, that is supplied with fuel gas that has been preheated in a gas preheater incorporated in the inlet end of the vessel to vaporize any liquid hydrocarbon fractions contained in the fuel gas. An igniter is provided in association with the heating tube to ignite the fuel gas within the firetube. The two legs of the u-shaped firetube are horizontally oriented relative to each other so that they both reside completely in the heating portion of the vessel above the oil-water interface and below the gas-oil interface. Thus, the firetube is always surrounded only with oil and does not come into contact with the water or the gas. The water remains below the firetube and the gas remains above the firetube. A level control maintains the oil-water interface and a fixed weir spillover baffle maintains the gas-oil interface such that the firetube is only contacted by oil. Safety features ensure that the unit shuts down if the gas-oil interface level approaches the top of the firetube.

A sand trap is located at the bottom of the vessel in the heating portion of the vessel as a means of removing particulate matter that settles at the bottom of the vessel. The sand trap is designed with an inverted v-shaped cover that extends longitudinally on the bottom of the vessel. The cover of the sand trap is provided with a plurality of triangular or inverted v-shaped cutouts provided in the cover on either side of the cover. A blow down drain communicates with the underside of the sand trap as a means of blowing down any particulate material that accumulates in and around the sand trap.

The perforated baffle serves to reflect heat from the firetube back into the heating portion of the vessel. The perforated baffle also serves to equalize and re-distribute the flow of fluid at the sides of the vessel with that occurring in the middle of the vessel as the fluid flows from the inlet to outlet ends of the vessel.

The perforated baffle separates the heating portion of the vessel from the settling portion of the vessel. The settling portion of the vessel is located at the outlet end of the vessel. The settling portion of the vessel is bounded on its upstream end by the perforated baffle and on its downstream end by the spillover baffle near the outlet end cap of the vessel.

The settling portion of the vessel is provided with a vane section that extends to the interior wall of the vessel on all sides of the vane section. The vane section is composed of tightly packed bent lamella or parallel plates oriented 60° to vertical that serve as a demister for the gas that flows through the top portion of the vane section and as a coalescing device for the oil and water that flow through the lower portions of the vane section.

The bent lamella separator vanes are provided with a plurality of thin plate-like structures or lamellae that are fitted parallel, in modular form, and very close to one another, with open spaces between adjacent lamellae. The lamellae are oriented at an angle of approximately 60 degrees to perpendicular increasing the surface area available for settling. The lamellae are corrugated so that fluid flowing through the vane section follows a tortuous path along the angled corrugated lamellae. Lamella separators provide a significant improvement with regard to the efficiency of the separation process.

Downstream of the vane section, the remainder of the settling portion of the vessel provides residence time for the separation process to be completed. Separated gas located at the top of the vessel flows around a gas vortex breaker located immediately upstream of the gas outlet before flowing out of the gas outlet provided at the top of the vessel on the outlet end. Separated water located at the bottom of the vessel flows around a vortex breaker located immediately upstream of the oil spillover baffle and then flows out of the water outlet provided at the bottom of the vessel on the outlet end and upstream of an oil spillover weir. Oil flows over the oil spillover weir provided at the outlet end of the vessel and into an oil collection reservoir provided downstream of the oil spillover weir and between the oil spillover weir and the outlet end of the tank. The oil then flows around a vortex breaker located in the oil collection reservoir in association with the oil outlet before flowing out of the oil outlet that is provided in the oil collection reservoir.

BRIEF DESCRIPTION OF THE DRAWINGS

FIG. 8 is an enlarged isometric view of the vane section from FIG. 1.

FIG. 9 is a front end view of the oil spillover plate from FIG. 1.

DETAILED DESCRIPTION OF THE PREFERRED EMBODIMENT

Figure 1:
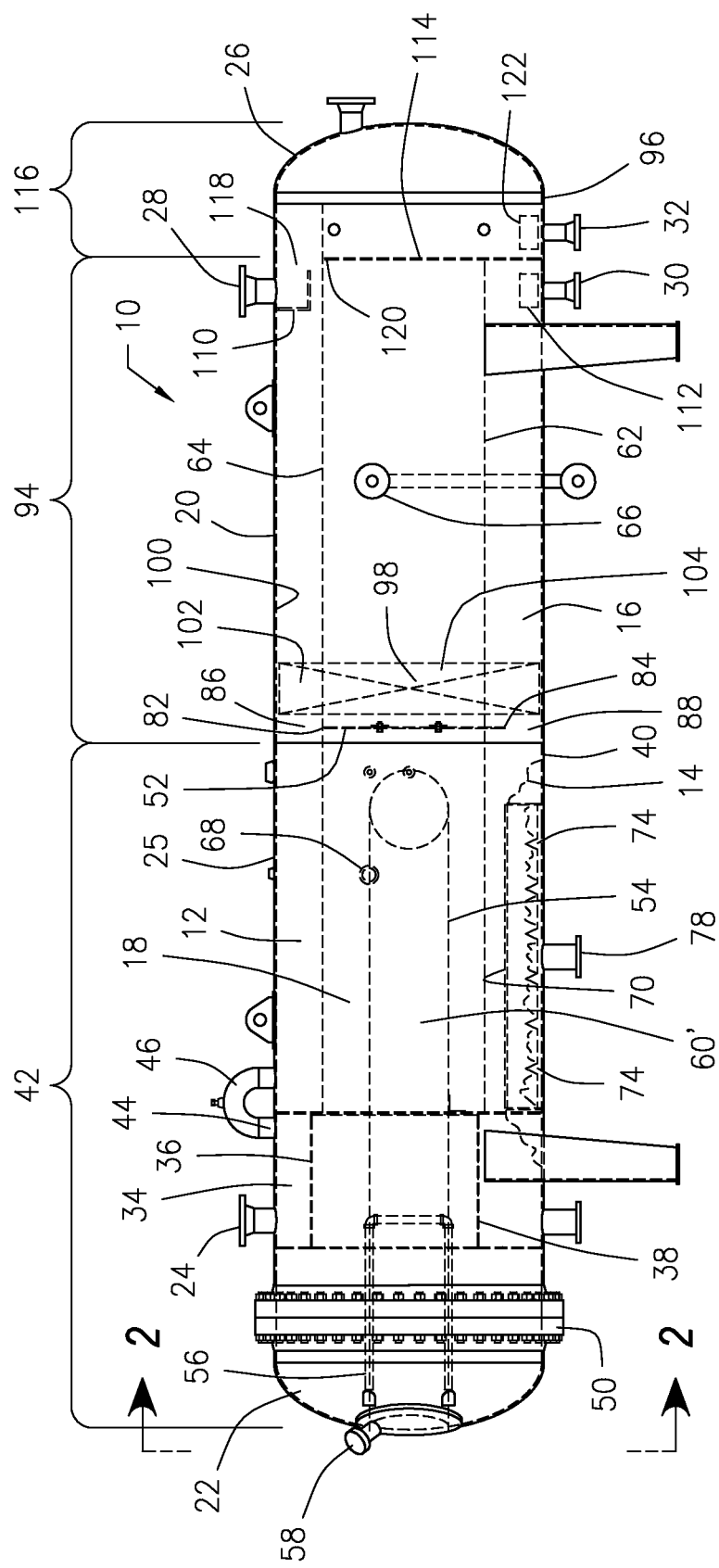
FIG. 1 is a side view of a horizontal heater treater constructed in accordance with a preferred embodiment of the present invention showing the locations of internal components in outline.

Referring now to the drawings and initially to FIG. 1, there is illustrated a heater treater 10 constructed in accordance with a preferred embodiment of the present invention for the treatment of petroleum mixtures such as crude oil. The heater treater 10 is designed to treat petroleum mixtures by separating the gas 12 and the sediment 14 and water 16 from the oil 18. Bottom sediment 14 and water 16 are commonly referred to collectively as BS&W. This heater treater 10 employs a horizontal vessel 20 having an inlet end 22 provided with an inlet 24 in a top 25 of the vessel 20 into which is introduced the petroleum mixture to be separated. The vessel 20 also has an opposite outlet end 26 provided with a gas outlet 28, a water outlet 30 and an oil outlet 32 where the separated components are removed from the vessel 20. The gas outlet 28 is provided in the top 25 of the vessel 20, and the water outlet 30 and the oil outlet 32 are both provided in the bottom 40 of the vessel 20, as illustration and as will be more fully explained hereafter.

Figure 2:
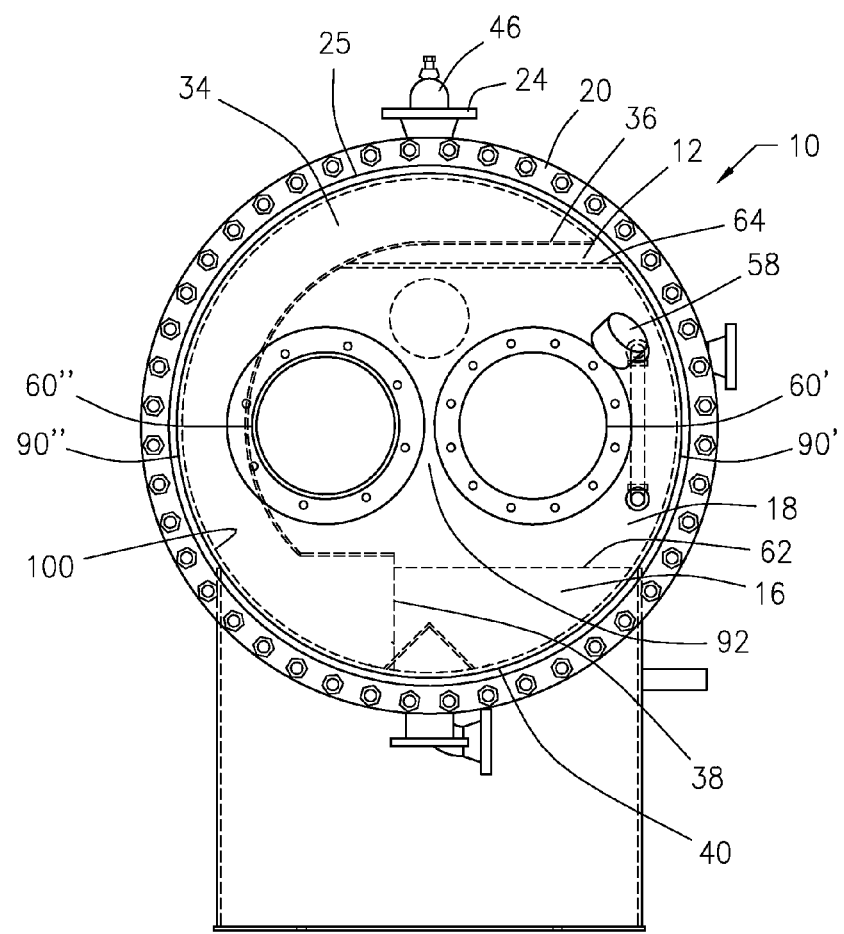
FIG. 2 is an enlarged front end view of the horizontal heater treater taken along line 2-2 of FIG. 1 showing the locations of internal components in outline.
Figure 4:
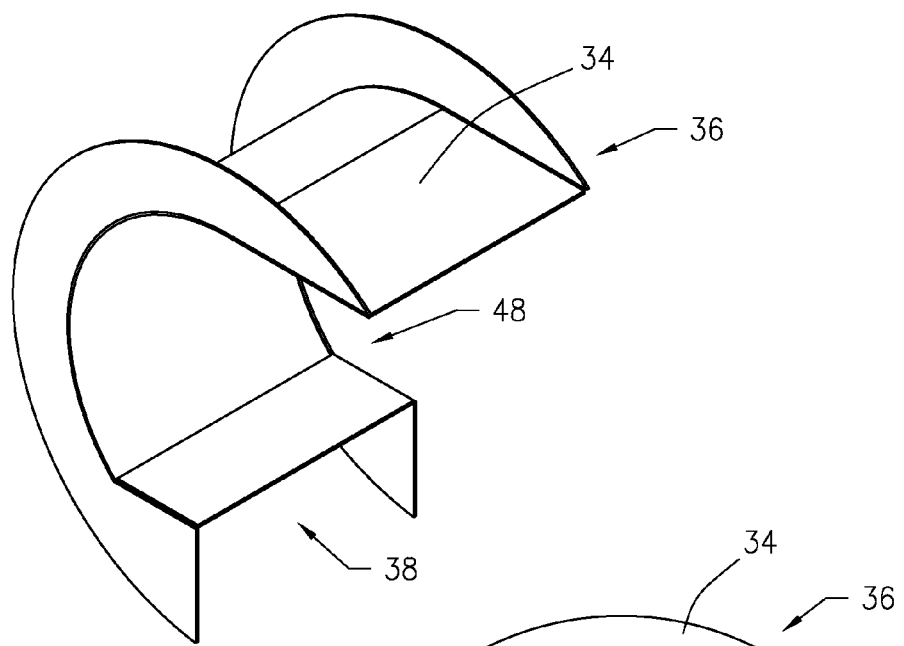
FIG. 4 is perspective view of the inlet diverter of FIG. 3.
Figure 3:
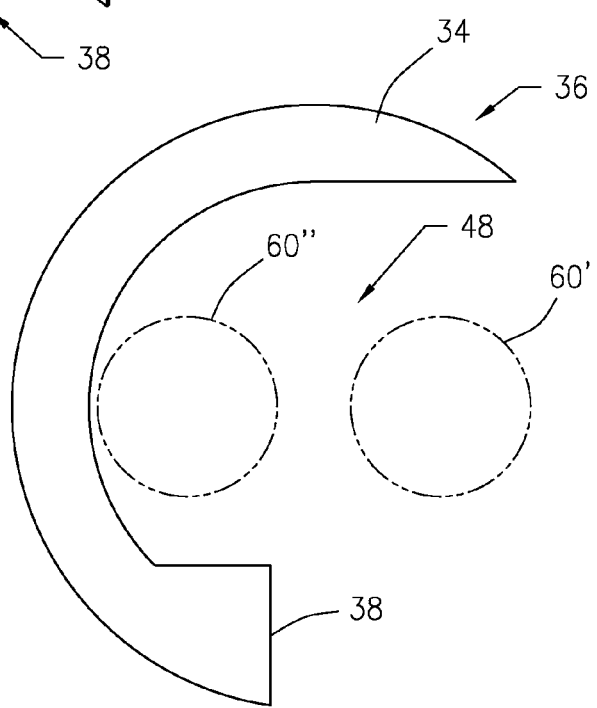
FIG. 3 is a front end view of the inlet diverter that is shown in outline in FIG. 2, with this drawing showing the position of the heater tubes in outline.

The inlet 24 communicates with a top portion 34 of an inlet diverter 36 provided within the vessel 20 on the inlet end 22 of the vessel 20. The inlet diverter 36 is c-shaped upon viewing the vessel 20 from a cross-sectional perspective, as shown in FIGS. 2, 3, and 4. The c-shaped inlet diverter 36 has two exits: a bottom exit 38 where the oil 18 and water 16 leave the diverter 36 and enter at a bottom 40 of the vessel 20 in a heating portion 42 of the vessel 20, and a top exit 44 where the gas 12 exits the diverter 36 via an inverted u-shaped gas equalizer tube 46 and enters the top 25 of the vessel 20 in the heating portion 42 of the vessel 20. Any settleable sediment 14 or particles in the oil 18 or water 16 will sink to the bottom 40 of the vessel 20 within the heating portion 42 of the vessel 20, while the light components will rise to the top 25 of the vessel 20.

The heating portion 42 of the vessel 20 extends through the hollow center 48 of the c-shaped inlet diverter 36 and is bounded on its upstream end or inlet end 22 of the vessel 20 by the full diameter inlet flange 50 of the vessel 20 and is bounded on the outlet end 26 of the vessel 20 by a perforated baffle 52 which is located approximately midway between the two ends 22 and 26 of the vessel 20.

The heating portion 42 of the vessel 20 includes a u-shaped heating tube or firetube 54 that is located centrally within the heating portion 42. The firetube 54 is supplied with fuel gas (not shown) that has been preheated in a gas preheater 56 that is incorporated in the inlet end 22 of the vessel 20. An igniter 58 is provided in association with the heating tube 54 to ignite the fuel gas within the heating tube 54. Referring now to FIGS. 1 and 2, the two legs 60' and 60" of the u-shaped firetube 54 are horizontally oriented relative to each other so that they both reside completely in the heating portion 42 of the vessel 20 above an oil-water interface 62 and below a gas-oil interface 64. Thus, the firetube 54 is always surrounded only with oil 18. The water 16 remains below the firetube 54 and the gas 12 remains above the firetube 54. Level controls 66 maintain the oil-water interface 62 and an oil weir 114 and removal of gas 12 from the vessel 20 controls the gas-oil interface 64 such that the firetube 54 is only contacted by oil 18. Safety features 68 ensure that the unit 10 shuts down if the gas-oil level reaches the firetube 54.

Figure 5:
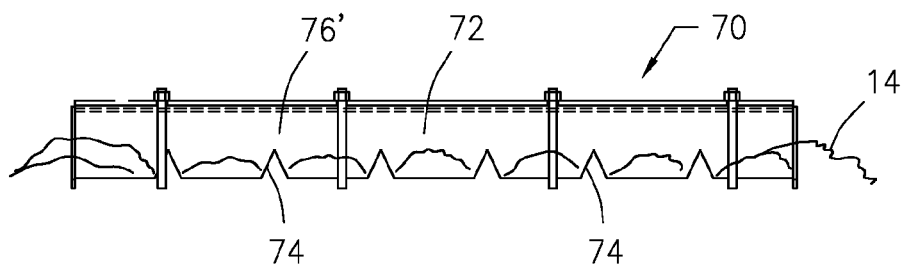
FIG. 5 is an enlarged side view of the sand trap from FIG. 1.
Figure 6:
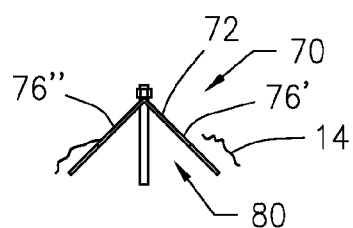
FIG. 6 is a front end view of the sand trap of FIG. 5.

Referring to FIGS. 1, 5 and 6, a sand trap 70 is located at the bottom 40 of the vessel 20 in the heating portion 42 of the vessel 20 as a means of removing sediment 14 or particulate matter that settles to the bottom 40 of the vessel 20. The sand trap 70 is designed with an inverted v-shaped cover 72 that extends longitudinally on the bottom 40 of the vessel 20. The cover 72 is provided with a plurality of triangular or inverted v-shaped cutouts 74 provided in the cover 72 on either side 76' and 76" of the cover 72. A sediment blow down drain 78 communicates with the underside 80 of the sand trap 70 as a means of blowing down any sediment 14 that accumulates in and around the sand trap 70.

Figure 7:
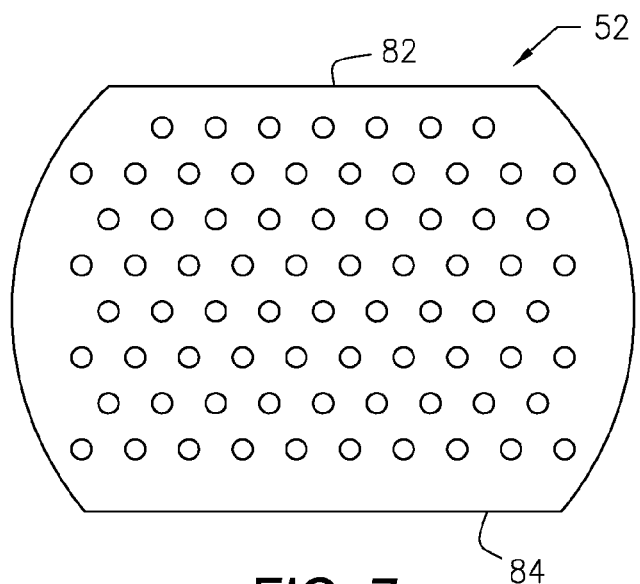
FIG. 7 is an enlarged front end view of the perforated baffle from FIG. 1.

Referring to FIGS. 1 and 7, the perforated baffle 52 does not extend to the top 25 and bottom 40 of the vessel 20 on its top and bottom edges 82 and 84. A gas gap 86 formed between the top edge 82 of the baffle 52 and the top 25 of the vessel 20 allows separated gas 12 to flow over the top of edge 82 of the perforated baffle 52. A water gap 88 formed between the bottom edge 84 of the baffle 52 and the bottom 40 of the vessel 20 allows separated water 16 to flow undisturbed under the bottom edge 84 of the perforated baffle 52.

The perforated baffle 52 serves to reflect heat from the firetube 54 back into the heating portion 42 of the vessel 20, and also serves to equalize the flow of oil 18 at the sides 90' and 90" of the vessel 20 with that occurring in the middle 92 of the vessel 20 as the fluid flows from the inlet end 22 to the opposite outlet end 26 of the vessel 20.

The perforated baffle 52 separates the heating portion 42 of the vessel 20 from a settling portion 94 of the vessel 20 which is located at the outlet end 26 of the vessel 20. The settling portion 94 of the vessel 20 is bounded on its upstream end by the perforated baffle 52 and on its downstream end by the outlet end cap or flange 96 of the vessel 20.

Both the inlet flange 50 and the outlet flange 96 may be removable so that the inside of the vessel 20 can be accessed for cleaning and maintenance.

Referring now to FIGS. 1 and 8, the settling portion 94 of the vessel 20 is provided with a vane section 98 that extends to the wall 100 of the vessel 20 on the top 25, bottom 40 and both sides 90' and 90" of the vessel 20 so that all the gas 12 and the liquids, i.e. oil 18 and water 16, flowing from the heating portion 42 of the vessel 20 to the exit or outlet end 26 of the vessel 20 must pass through the vane section 98. The vane section 98 is preferably a bent lamella separator 98 that serves as a demister for the gas 12 that flows through a top or upper portion 102 of the vane section 98 and as a coalescing device for the oil 18 and water 16 that flow through the bottom or lower portion 104 of the vane section 98.

The bent lamella separator 98 is provided with a plurality of thin plate-like structures or lamellae 106 that are fitted parallel, in modular form, and very close to one another, with open spaces 108 between adjacent lamellae 106. The lamellae 106 are oriented at an angle A of approximately 60 degrees to perpendicular which serves to increase the surface area available for separation and settling. The lamellae 106 are corrugated so that fluid flowing through the vane section 98 follows a tortuous path along the angled corrugated lamellae 106. Lamella separators 98 provide a significant improvement with regard to the efficiency of the separation process and are widely used in the separation of water, oils, suspended solids and other contaminants.

Downstream of the vane section 98, the remainder of the settling portion 94 of the vessel 20 provides residence time for the separation process to be completed. Separated gas 12 located at the top 25 of the vessel 20 flows around a gas vortex breaker 110 located immediately upstream of the gas outlet 28 before flowing out of the gas outlet 28 provided at the top 25 of the vessel 20 on the outlet end 26. Separated water 16 located at the bottom 40 of the vessel 20 flows around a water vortex breaker 112 located in association with the water outlet 30 before flowing out of the water outlet 30 provided at the bottom 40 of the vessel 20 on the outlet end 26 immediately upstream of an oil spillover weir 114.

As shown in FIG. 9, the oil spillover weir 114 extends to the wall 100 of the vessel 20 on the bottom 40 and both sides 90' and 90" of the vessel 20, but does not extend to the top 25 of the vessel 20. An oil gap 118 is formed between a top edge 120 of the oil spillover weir 114 and the top 25 of the vessel 20. An oil collection compartment 116 is formed on the downstream side of the weir 114 and is located between the weir 114 and the outlet end 26 of the vessel 20.

Oil 18 from the settling portion 94 of the vessel 20 flows over the top edge 120 of the oil spillover weir 114 and through the oil gap 118 into the oil collection compartment 116. The oil 18 from the oil collection compartment 116 then travels around an oil vortex breaker 122 located in association with the oil outlet 32 before flowing out of vessel 20 via the oil outlet 32 that is provided in the oil collection compartment 116.

While the invention has been described and illustrated with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A heater treater for treating petroleum mixtures to separate gas, sediment and water from oil comprising:
    a horizontal vessel with an inlet end and an opposite outlet end of the vessel, said vessel divided into a heated portion on the inlet end where the oil is heated to reduce its viscosity so that water can separate from the oil and a settling portion on the outlet end that provides residence time for the water and oil to separate,
    an inlet to the vessel provided in a top of the vessel at the inlet end, said inlet communicating with a top portion of a c-shaped inlet diverter provided within the vessel on the inlet end,
    said c-shaped inlet diverter having a bottom exit where the oil and water leave the diverter and enter the heating portion of the vessel, said c-shaped inlet diverter having a top exit where the gas enters the top of the vessel in the heating portion of the vessel,
    a perforated baffle separating the heating portion of the vessel from the settling portion of the vessel so that the baffle reflects heat back to the heating portion and equalizes flow of oil at the sides and the middle of the vessel as the fluid flows from the heating portion to the settling portion of the vessel,
    a u-shaped horizontal firetube provided centrally within the heating portion for heating the oil,
    a sand trap located at the bottom of the vessel in the heating portion of the vessel as a means of removing sediment from the vessel,
    a vane section located immediately downstream of the perforated baffle and extending to the walls of the vessel so that gas and fluids flowing from the heating portion to the settling portion of the vessel pass through the vane section, said vane section provided with spaced apart corrugated plates separated from each other and oriented at an angle so that the vane section serves as a demister for the gas that flows through it and serves as a coalescing device for the oil and water that flow through it, a water outlet provided in the bottom of the vessel at the downstream end of the settling portion, a gas outlet provided in the top of the vessel at the outlet end, an oil spillover weir provided at the exit end of the vessel and extending to the wall of the vessel on the bottom and both sides of the vessel so that an oil gap is formed between a top edge of the oil spillover weir and the top of the vessel, an oil collection compartment located on the downstream side of the weir between the weir and the outlet end of the vessel, and an oil outlet provided in the oil collection compartment.

2. A heater treater for treating petroleum mixtures such as crude oil to separate the gas, the sediment and the water from the oil according to claim 1 wherein said perforated baffle is located approximately midway between the two ends of the vessel.

3. A heater treater for treating petroleum mixtures such as crude oil to separate the gas, the sediment and the water from the oil according to claim 1 further comprising:
said heating portion extends through an enclosed hollow center of the c-shaped inlet diverter and is bounded on its inlet end by an inlet flange of the vessel.

4. A heater treater for treating petroleum mixtures such as crude oil to separate the gas, the sediment and the water from the oil according to claim 3 wherein the inlet flange is removable so that the inside of the vessel can be accessed for cleaning and maintenance.

5. A heater treater for treating petroleum mixtures such as crude oil to separate the gas, the sediment and the water from the oil according to claim 1 further comprising:
a gas preheater provided at the inlet end of the vessel in association with said firetube for preheating fuel gas to be burned in the firetube.

6. A heater treater for treating petroleum mixtures such as crude oil to separate the gas, the sediment and the water from the oil according to claim 1 further comprising:
an igniter provided in association with the firetube to ignite fuel gas within the heating tube.

7. A heater treater for treating petroleum mixtures such as crude oil to separate the gas, the sediment and the water from the oil according to claim 1 further comprising:
two legs of the u-shaped firetube are horizontally oriented relative to each other so that they both reside completely in the heating portion of the vessel 20 above an oil-water interface and below a gas-oil interface so the firetube is always surrounded only with oil.

8. A heater treater for treating petroleum mixtures such as crude oil to separate the gas, the sediment and the water from the oil according to claim 1 further comprising:
level control provided in association with the vessel to maintain the level of a gas-oil interface within the vessel.

9. A heater treater for treating petroleum mixtures such as crude oil to separate the gas, the sediment and the water from the oil according to claim 1 further comprising:
safety features provided in the vessel for shutting down the vessel if the level of the gas-oil interface reaches the firetube.

10. A heater treater for treating petroleum mixtures such as crude oil to separate the gas, the sediment and the water from the oil according to claim 1 further comprising:
an inverted v-shaped cover provided on the sand trap, said cover extending longitudinally on the bottom of the vessel, said cover provided with a plurality of triangular cutouts on either side of the cover, and
a sediment blow down drain communicating with an underside of the sand trap to provided a place where sediment can be blown out of the vessel.

11. A heater treater for treating petroleum mixtures such as crude oil to separate the gas, the sediment and the water from the oil according to claim 1 further comprising:
said perforated baffle having a top edge that is spaced apart from the top of the vessel to form a gas gap there between through which gas flows from the heating portion to the settling portion of the tank, and
said perforated baffle having a bottom edge that is spaced apart from the bottom of the vessel to form a water gap there between through which water flows from the heating portion to the settling portion of the tank.

12. A heater treater for treating petroleum mixtures such as crude oil to separate the gas, the sediment and the water from the oil according to claim 1 further comprising:
said settling portion of the vessel is bounded on its upstream end by the perforated baffle and bounded on its downstream end by the outlet end cap or flange of the vessel.

13. A heater treater for treating petroleum mixtures such as crude oil to separate the gas, the sediment and the water from the oil according to claim 1 wherein said vane section further comprises:
a series of angular bent parallel plates oriented to form a lamella separator.

14. A heater treater for treating petroleum mixtures such as crude oil to separate the gas, the sediment and the water from the oil according to claim 1 wherein said vane section further comprises:
a bent lamella separator provided with a plurality of thin plate-like lamellae that are fitted in parallel modular form very close to one another with open spaces between adjacent lamellae, said lamellae are oriented at an angle of approximately 60 degrees to perpendicular, and said lamellae are angularly corrugated.

15. A heater treater for treating petroleum mixtures such as crude oil to separate the gas, the sediment and the water from the oil according to claim 1 wherein said settling portion further comprises:
a gas vortex breaker located immediately upstream of and covering the gas outlet.

16. A heater treater for treating petroleum mixtures such as crude oil to separate the gas, the sediment and the water from the oil according to claim 1 wherein said settling portion further comprises:
a water vortex breaker provided in association with and covering the water outlet.

17. A heater treater for treating petroleum mixtures such as crude oil to separate the gas, the sediment and the water from the oil according to claim 1 wherein said oil collection compartment further comprises:
an oil vortex breaker provided in association with and covering the oil outlet.

18. A heater treater for treating petroleum mixtures such as crude oil to separate the gas, the sediment and the water from the oil according to claim 1 wherein said heated portion further comprises:
an external inverted u-shaped gas equalizer tube connecting the top exit of the inlet diverter to the heated portion so that gas exiting the inlet diverter enters the gas area of the heated portion via the tube.

19. A method for treating petroleum mixtures comprising the following steps:

introducing a petroleum mixture to be separated into an inlet diverter of a heater treater that is constructed in accordance with claim 1, causing gas that separates from the petroleum mixture in the inlet diverter to pass to the top of a heating section of the heater treater, causing the remaining petroleum mixture to exit the inlet diverter at the bottom of the heating section, allowing sediment to fall to the bottom of the heater treater where it is removed from the heater treater, allowing water contained within the remaining petroleum mixture to begin separating from the oil, with the separated water flowing to and remaining at the bottom of the heating section, allowing the separated oil to rise within the heating section around a horizontally oriented firetube, maintaining within the heating section the water-oil interface below the firetube and the gas-oil interface above the firetube so that the firetube is continually surrounded only with oil, firing the firetube to heat the oil in order to reduce its viscosity, passing the oil through a perforated redistribution baffle to equalize flow between the heating and settling portion of the heater treater as the oil flows from the heating portion to the settling portion of the heater treater, passing the gas and fluids through an angularly oriented corrugated lamella vane section which serves as a demister for the gas that flows through the top portion of the vane section and as a coalescing device for the oil and water that flow through the lower portions of the vane section, providing residence time in the settling portion of the heater treater to allowing completion of the separation of the gas, oil and water, removing the gas from the settling portion of the heater treater after passing it around a gas vortex breaker, removing the water from the settling portion of the heater treater after passing around a water vortex breaker, allowing the oil to spill over a fixed oil weir into an oil collection reservoir located on the downstream side of the weir, and removing the oil from the oil collection reservoir of the heater treater after passing it around an oil vortex breaker.

* * * * *